United States Patent
Yun et al.

(10) Patent No.: US 7,593,199 B2
(45) Date of Patent: Sep. 22, 2009

(54) CONTROL SIGNAL GENERATION CIRCUIT AND BATTERY MANAGEMENT SYSTEM USING THE SAME

(75) Inventors: Han-Seok Yun, Yongin-si (KR); Se-Wook Seo, Yongin-si (KR); Gye-Jong Lim, Yongin-si (KR)

(73) Assignee: Samsung SDI Co., Ltd., Suwon-si (KR)

(*) Notice: Subject to any disclaimer, the term of this patent is extended or adjusted under 35 U.S.C. 154(b) by 323 days.

(21) Appl. No.: 11/516,693

(22) Filed: Sep. 7, 2006

(65) Prior Publication Data

US 2007/0052462 A1 Mar. 8, 2007

(30) Foreign Application Priority Data

Sep. 8, 2005 (KR) .................. 10-2005-0083671

(51) Int. Cl.
*H02H 3/00* (2006.01)
(52) U.S. Cl. .......................................... 361/18
(58) Field of Classification Search .................. 361/18
See application file for complete search history.

(56) References Cited

U.S. PATENT DOCUMENTS

| | | | |
|---|---|---|---|
| 5,281,871 A | 1/1994 | Mori et al. | |
| 6,661,260 B2 * | 12/2003 | Nakahara et al. | 327/109 |
| 6,788,132 B2 * | 9/2004 | Lim et al. | 327/540 |
| 2005/0127874 A1 | 6/2005 | Lim et al. | |

FOREIGN PATENT DOCUMENTS

| | | |
|---|---|---|
| CN | 1447305 | 10/2003 |
| EP | 0589287 | 9/1993 |
| JP | 4-302523 | 10/1992 |
| JP | 2001-204141 | 7/2001 |
| WO | WO 99/01918 | 1/1999 |

OTHER PUBLICATIONS

Office Action issued in corresponding European Patent Application No. 06120364.2 dated Feb. 19, 2008.

* cited by examiner

*Primary Examiner*—Stephen W Jackson
(74) *Attorney, Agent, or Firm*—Stein McEwen, LLP

(57) ABSTRACT

A control signal generating circuit used in a battery management system may stably generate a control signal. The control signal generating circuit includes a first signal line transmitting a first control signal having an on-level or an off-level, a second signal line transmitting a second control signal having an on-level or an off-level, and a third signal line transmitting a third control signal having an on-level or an off-level. In addition, the control signal generating circuit includes a transistor including a first electrode coupled to the first signal line and a second electrode applied with the off-level. The transistor electrically connects the first and second electrodes and converts the first control signal into a fourth control signal by being turned on based on the second and third control signals. Finally, the control signal generating circuit includes a circuit unit generating a fifth control signal having the on-level when the second and third control signals are input and have the off-level.

31 Claims, 10 Drawing Sheets

CONTROL SIGNAL GENERATION CIRCUIT AND BATTERY MANAGEMENT SYSTEM USING THE SAME

CROSS-REFERENCE TO RELATED APPLICATION

This application claims the benefit of Korean Patent Application No. 2005-83671 filed in the Korean Intellectual Property Office on Sep. 8, 2005, the content of which is incorporated herein by reference.

BACKGROUND OF THE INVENTION

1. Field of the Invention

An aspect of the present invention relates to a battery management system. More particularly, an aspect of the present invention relates to a battery management system of a vehicle utilizing electrical energy.

2. Description of the Related Art

Vehicles using gasoline or a heavy oil internal combustion engine cause serious air pollution. Accordingly, various efforts for developing electric or hybrid vehicles have recently been made to reduce air pollution.

An electric vehicle uses a battery engine run by electrical energy output by a battery. Since the electric vehicle mainly uses a battery formed by one battery pack including a plurality of rechargeable/dischargeable secondary cells, the electric vehicle has no gas emissions and produces less noise.

A hybrid vehicle commonly refers to a gasoline-electric hybrid vehicle that uses gasoline to power an internal combustion engine and an electric battery to power an electric motor. Recently, hybrid vehicles using an internal combustion engine and fuel cells and hybrid vehicles using a battery and fuel cells have been developed. The fuel cells directly obtain electrical energy by generating a chemical reaction while hydrogen and oxygen are continuously provided.

Since battery performance directly affects a vehicle using electrical energy, it is required that each battery cell has great performance. Also, it is required to provide a battery management system measuring a voltage and a current of the overall battery to efficiently manage charging/discharging operations of each battery cell.

The above information is only for enhancement of the understanding of the background of the invention and therefore it may contain information that does not constitute the prior art already known in this country to a person of ordinary skill in the art.

SUMMARY OF THE INVENTION

An aspect of the present invention has been made in an effort to provide a battery management system having advantages of more efficiently measuring a battery cell voltage using a small number of elements.

An control signal generating circuit according to an embodiment of the present invention may include: a first signal line transmitting a first control signal having an on-level or an off-level; a second signal line transmitting a second control signal having an on-level or an off-level; a third signal line transmitting a third control signal having an on-level or an off-level; a transistor including a first electrode coupled to the first signal line and a second electrode applied with the off-level, and the transistor converting the first control signal into a fourth control signal by being turned on based on the second and third control signals; and a circuit unit generating a fifth control signal having the on-level when the second and third control signals are input and have the off-level.

Another control signal generating circuit according to another embodiment of the present invention may include: a first input terminal receiving a first control signal having a first level or a second level as an inverted level of the first level; a second input terminal receiving a second control signal having the first level or the second level; a third input terminal receiving a third control signal having the first level or the second level; a transistor including a first electrode coupled to the first input terminal, a second electrode applied with the second level, and a control electrode being electrically connected to the second and third input terminals; an inverter outputting fourth, fifth, and sixth control signals by respectively converting the first, second, and third control signals respectively transmitted through the first electrode of the transistor, the second input terminal, and the third input terminal; and a circuit unit generating a seventh control signal having the second level when the fifth and sixth control signals are the first level.

A further control signal generating circuit according to another embodiment of the present invention may include: a control signal generating circuit; a first signal line transmitting a first control signal having a low level or a high-level; a second signal line transmitting a second control signal having a low level or a high level; and a transistor including a first electrode coupled to the first signal line, a second electrode coupled to a ground electrode, and electrically connecting the first and second electrodes and changing the first control signal to be the low level by being turned on when the second control signal is the high level.

Yet another control signal generating circuit according to another embodiment of the present invention may include: a plurality of first signal lines respectively transmitting a plurality of first control signals; a plurality of first resistors having first and second terminals, the first terminals being respectively coupled to a plurality of the first signal lines; second and third signal lines respectively transmitting second and third control signals; and a plurality of transistors being electrically connected to the second terminals of the first resistors and changing a potential of the second terminals of the plurality of first resistors to be the first level by being turned on based on the second or third control signal.

An battery management system coupled to a battery formed with one pack having a plurality of battery cells including first and second battery cells according to another embodiment of the present invention may include: a control signal generator outputting a first control signal and second, third, and fourth control signals having a first level at different timing from the first control signal; first and second relays respectively transmitting cell voltages of the first and second battery cells by being turned on in response to the first level of the first and second control signals; a third relay transmitting the cell voltage transmitted through one of the first and second relays in response to the third control signal with the first level; a charging unit storing the cell voltage transmitted from the third relay; a fourth relay transmitting the stored cell voltage of the charging unit in response to the first level of the fourth control signal; and an A/D converter converting the cell voltage transmitted through the fourth relay into digital data, wherein the control signal generator makes the first and second control signals to be a second level excluding the first level when the fourth control signal is the first level and makes the third control signal to be the second level.

According to another embodiment of the present invention, the control signal generator may include a common electrode having a potential of the second level; a first transistor including a first electrode applied with the first control signal, a second electrode coupled to the common electrode, and a first control electrode applied with the fourth control signal, and electrically connecting the first and second electrodes by being turned on when the fourth control signal is the first level; and a second transistor including a third electrode applied with the second control signal, a fourth electrode coupled to the common electrode, and a second control electrode applied with the fourth control signal, and electrically connecting the third and fourth electrodes by being turned on when the fourth control signal is the first level. Another battery management system coupled to a battery formed with one pack having a plurality of battery cells including first and second battery cells according to the embodiment of the present invention may include: a control signal generator outputting a first control signal, second, third, and fourth control signals having a first level at different timing from the first control signal, and a fifth control signal shifted from the fourth control signal by a predetermined time; first and second relays respectively transmitting cell voltages of the first and second battery cells by being turned on in response to the first level of the first and second control signals; a third relay transmitting the cell voltage transmitted through one of the first and second relays in response to the third control signal with the first level; a charging unit storing the cell voltage transmitted from the third relay; a fourth relay transmitting the stored cell voltage of the charging unit in response to the first level of the fourth control signal; and an A/D converter converting the cell voltage transmitted through the fourth relay into digital data, wherein the control signal generator makes the first and second control signals to be a second level inverted from the first level when the fourth or fifth control signal is the first level, and the third control signals to be the first level when the fourth and fifth control signals are the second level.

According to another embodiment of the present invention, the control signal generator may include: a common electrode having a potential of the first level; a first transistor including a first electrode applied with the converted first control signal, a second electrode coupled to the common electrode, and a first control electrode applied with the fourth control signal, and electrically connecting the first and second electrodes by being turned on when the converted fourth control signal or the converted fifth control signal is the second level; and a second transistor including a third electrode applied with the converted second control signal and a fourth electrode coupled to the common electrode, and electrically connecting the third and fourth electrodes by being turned on when the converted fourth control signal or the converted fifth control signal is the first level; and an inverter outputting first, second, fourth, and fifth control signals by respectively converting the converted first, second, fourth, and fifth control signals respectively transmitted through the first electrode of the first transistor and the third electrode of the second transistor.

Yet another battery management system according to another embodiment of the present invention may include: a first input terminal receiving a first control signal; a second input terminal receiving a second control signal; a transistor including a first electrode coupled to the first input terminal, a second electrode applied with a voltage of a first level, and a control electrode coupled to the second input terminal and turned on when the second control signal is a second level excluding the first level; a first switch turned on when a third control signal transmitted through the first electrode of the transistor is the second level; and a second switch turned on when the second control signal is the second level.

Yet another battery management system according to another embodiment of the present invention may include: a first input terminal receiving a first control signal; a second input terminal receiving a third control signal that is the second control signal shifted by a predetermined time; an input terminal receiving a second control signal; a transistor including a first electrode coupled to the first input terminal, a second electrode applied with a voltage of a first level, and a control electrode coupled to the second input terminal and turned on when the second control signal is a second level excluding the first level; a first switch turned on when a third control signal transmitted through the first electrode of the transistor is the second level; a circuit unit generating a fifth control signal having the second level when the second control signal and the third control signal are the first level; and a third switch turned on when the fifth control signal is the second level.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
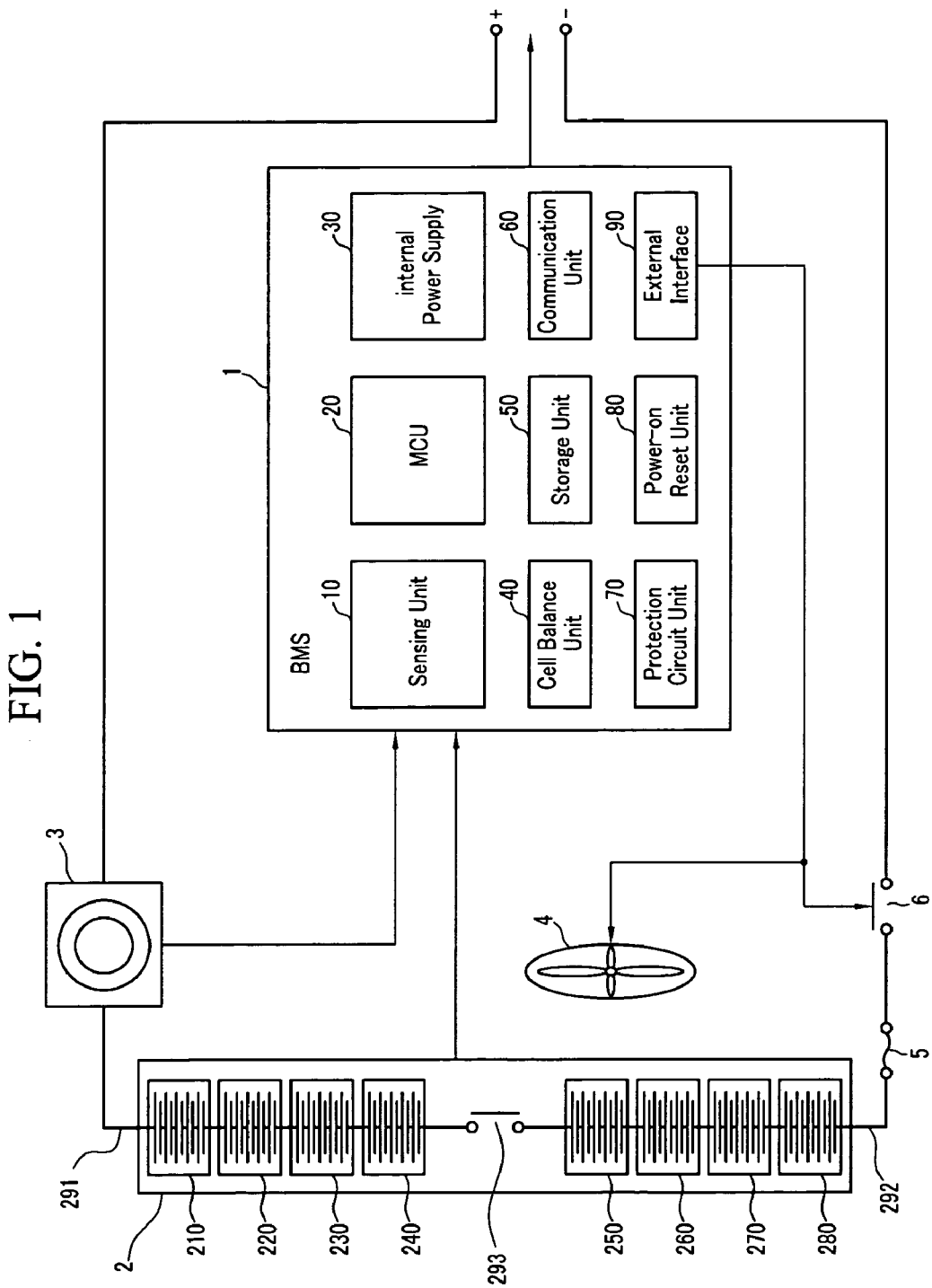
FIG. 1 schematically illustrates a battery, a battery management system, and peripheral devices thereof.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

In the following detailed description, only certain embodiments of the present invention have been shown and described, simply by way of illustration.

As those skilled in the art would realize, the described embodiments may be modified in various different ways, all without departing from the spirit or scope of the present invention.

Accordingly, the drawings and description are to be regarded as illustrative in nature and not restrictive.

Throughout this specification and the claims which follow, when it is described that an element is coupled to another element, the element may be directly coupled to the other element or electrically coupled to the other element through a third element. Throughout this specification and the claims which follow, unless explicitly described to the contrary, the word "comprise/include" or variations such as "comprises/includes" or "comprising/including" will be understood to imply the inclusion of stated elements but not the exclusion of any other elements.

FIG. 1 schematically illustrates a battery, a battery management system (BMS), and peripheral devices thereof.

As shown in FIG. 1, a BMS 1, a battery 2, a current sensor 3, a cooling fan 4, a fuse 5, and a main switch 6 are included. The current sensor 3 measures an output current amount of the battery 2 and outputs the same to the BMS 1. The cooling fan 4 cools heat generated by the charging/discharging of the battery 2 in response to a control signal of the BMS 1, and prevents the charge/discharge efficiency of the battery 2 from being deteriorated and reduced due to an increase of temperature. The fuse 5 prevents an overflow current due to a disconnection or a short circuit of the battery 2 from being transmitted to a power generator (not shown). That is, when the overflow current occurs, the fuse 5 is disconnected to interrupt the transmission of the overflow current. The main switch 6 turns on/off the battery 2 in response to the control signal of the BMS 1 when an abnormal phenomenon, including an over voltage, an overflow current, and a high temperature, occur.

The battery 2 includes eight sub-packs 210 to 280 coupled in series to each other, output terminals 291 and 292, and a safety switch 293 provided between the sub-packs 240 and 250. The sub-pack 210 includes five secondary battery cells coupled in series to each other. Likewise, the respective sub-packs 220 to 280 each include five secondary battery cells coupled in series to each other, and accordingly, the battery 2 includes a total of 40 battery cells.

Here, for better comprehension and ease of description of the present embodiment, the sub-packs are expressed as having a group of five secondary batteries. However, the battery may include 40 secondary battery cells directly coupled to each other without the sub-packs 210 to 280.

The output terminals 291 and 292 are coupled to the power generator (not shown) of the vehicle and supply electrical energy to an engine thereof. The safety switch 293 is a switch provided between the sub-packs 240 and 250, and is manually turned on/off so as to protect a worker when the worker replaces or handles the battery. In this embodiment, the safety switch 293 may be provided between the sub-packs 240 and 250, but is not limited thereto.

The BMS 1 includes a sensing unit 10, a main control unit (MCU) 20, an internal power supply 30, a cell balance unit 40, a storage unit 50, a communication unit 60, a protection circuit unit 70, a power-on reset unit 80, and an external interface 90.

The sensing unit 10 measures an overall battery pack current, an overall battery pack voltage, each battery cell voltage, each battery cell temperature, and a peripheral temperature, converts the measured values into digital data, and transmits the measured values to the MCU 20.

The MCU 20 generates five control signals BANK1_SENSE to BANK5_SENSE (not shown) and two control signals MODULE+_V and MODULE−_V (not shown) and outputs the generated signals to the sensing unit 10, determines a state of charging (SOC) and a state of health (SOH) of the battery 2 based on the measured value transmitted from the sensing unit 10, and controls the charging/discharging of the battery 2.

The internal power supply 30 supplies power to the BMS 1 using a backup battery.

The cell balance unit 40 checks a balance of the charging state of each cell. That is, cells of a relatively high charged state may be discharged and cells of a relatively low charged state may be charged.

The storage unit 50 stores data of the present SOC, SOH, or the like when the power source of the BMS 1 is turned off. Herein, the storage unit 50 may be an EEPROM as an electrically erasable and writable non-volatile memory.

The communication unit 60 communicates with a controller (not shown) of the power generator of the vehicle.

The protection circuit 70 protects the battery 2 from an external impact, an over-flowed current, or a low voltage by using a firmware.

The power-on reset unit 80 resets the overall system when the power source of the BMS 1 is turned on.

The external interface 90 couples the BMS auxiliary devices, including the cooling fan 4 and the main switch 6, to the MCU 20. In the present embodiment, the cooling fan 4 and the main switch 6 are illustrated as the auxiliary device of the BMS 1, but this is not restrictive.

Figure 2:
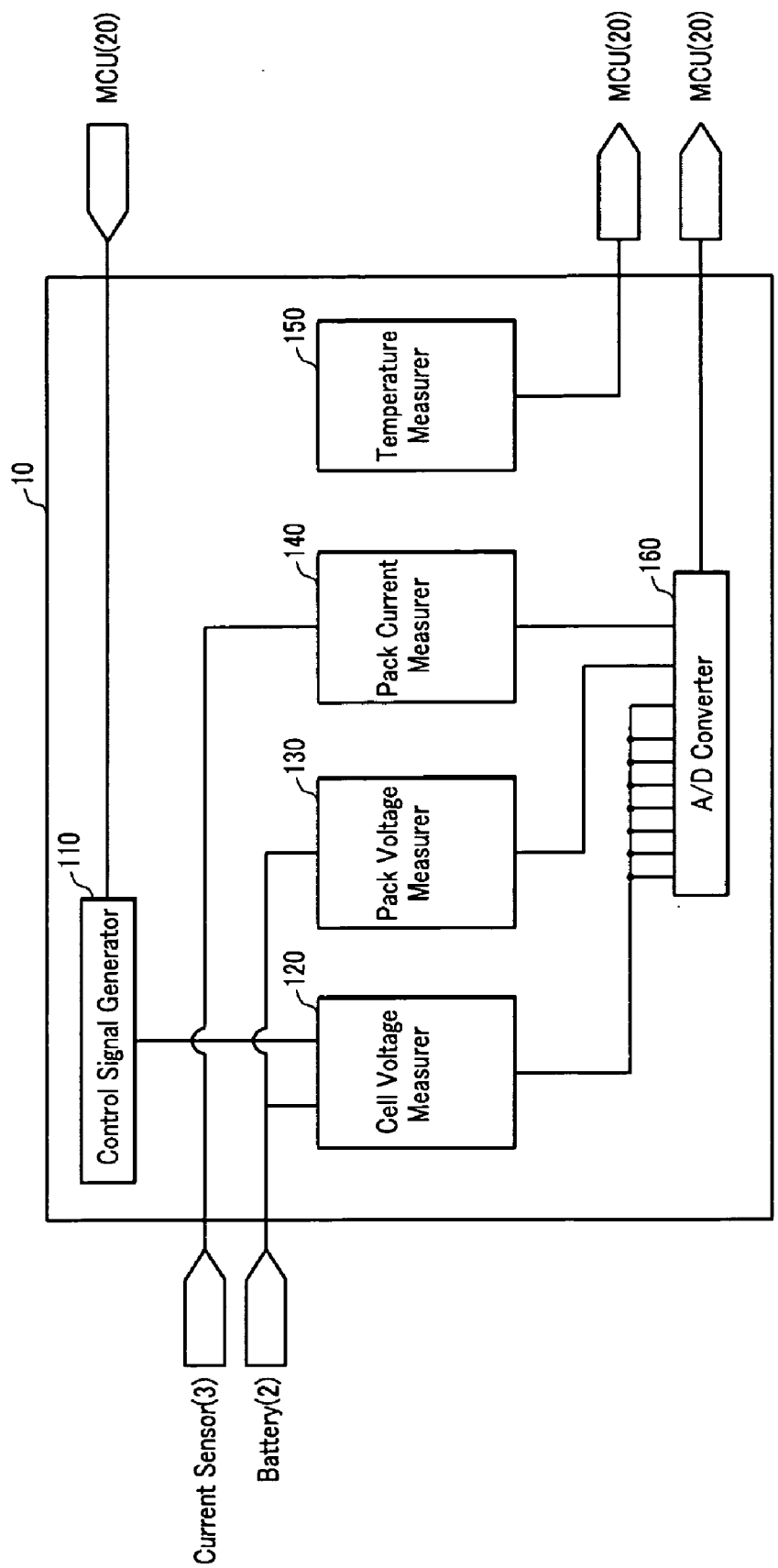
FIG. 2 schematically illustrates a sensing unit according to an embodiment of the present invention.

FIG. 2 schematically illustrates a sensing unit according to an embodiment of the present invention.

As shown in FIG. 2, the sensing unit 10 includes a control signal generator 110, a cell voltage measurer 120, a pack voltage measurer 130, a pack current measurer 140, a temperature measurer 150, and an A/D converter 160.

The control signal generator 110 receives the control signals BANK1_SENSE to BANK5_SENSE, and MODULE+_V, and MODULE−_V from the MCU 20 and transmits the control signals BANK1_SENSE to BANK5_SENSE, MODULE+_V, and MODULE−_V and MODULE_SW_1 to MODULE_SW_4 (see FIG. 3) to the cell voltage measurer 120.

The cell voltage measurer 120 measures analog voltages of the 40 battery cells 211 to 285 of the battery 2 and outputs the measured analog voltages to the A/D converter 160 based on the control signals BANK1_SENSE to BANK5_SENSE, MODULE+_V, and MODULE−_V, and MODULE_SW_1 to MODULE_SW_4 transmitted from the control signal generator 110.

The pack voltage measurer 130 measures an analog voltage value between the output terminals 291 and 292 of the battery 2 (see FIG. 1) and outputs the measured analog voltage to the A/D converter 160.

The pack current measurer 140 receives the current value measured from the current sensor 3 (see FIG. 1), converts the received current value into an analog voltage signal, and outputs the converted value to the A/D converter 160.

The temperature measurer 150 measures temperatures of the battery 2 and the surrounding environment thereof in digital values and outputs the measured digital values to the MCU 20.

The A/D converter 160 converts the analog values received from the cell voltage measurer 120, the pack voltage measurer 130, and the pack current measurer 140 into digital data and outputs the converted digital data to the MCU 20 (see FIG. 1). Specifically, the A/D converter 160 includes 10 input terminals and sequentially converts each analog data input from the input terminal into each digital data. Herein, eight input terminals (referred to as first to eighth input terminals) among the 10 input terminals are coupled to the output terminal of the cell voltage measurer 120, another input terminal (referred to as a ninth input terminal) is coupled to the pack voltage measurer 130, and the remaining input terminal (referred to as a tenth input terminal) is coupled to the pack current measurer 140.

Figure 3:
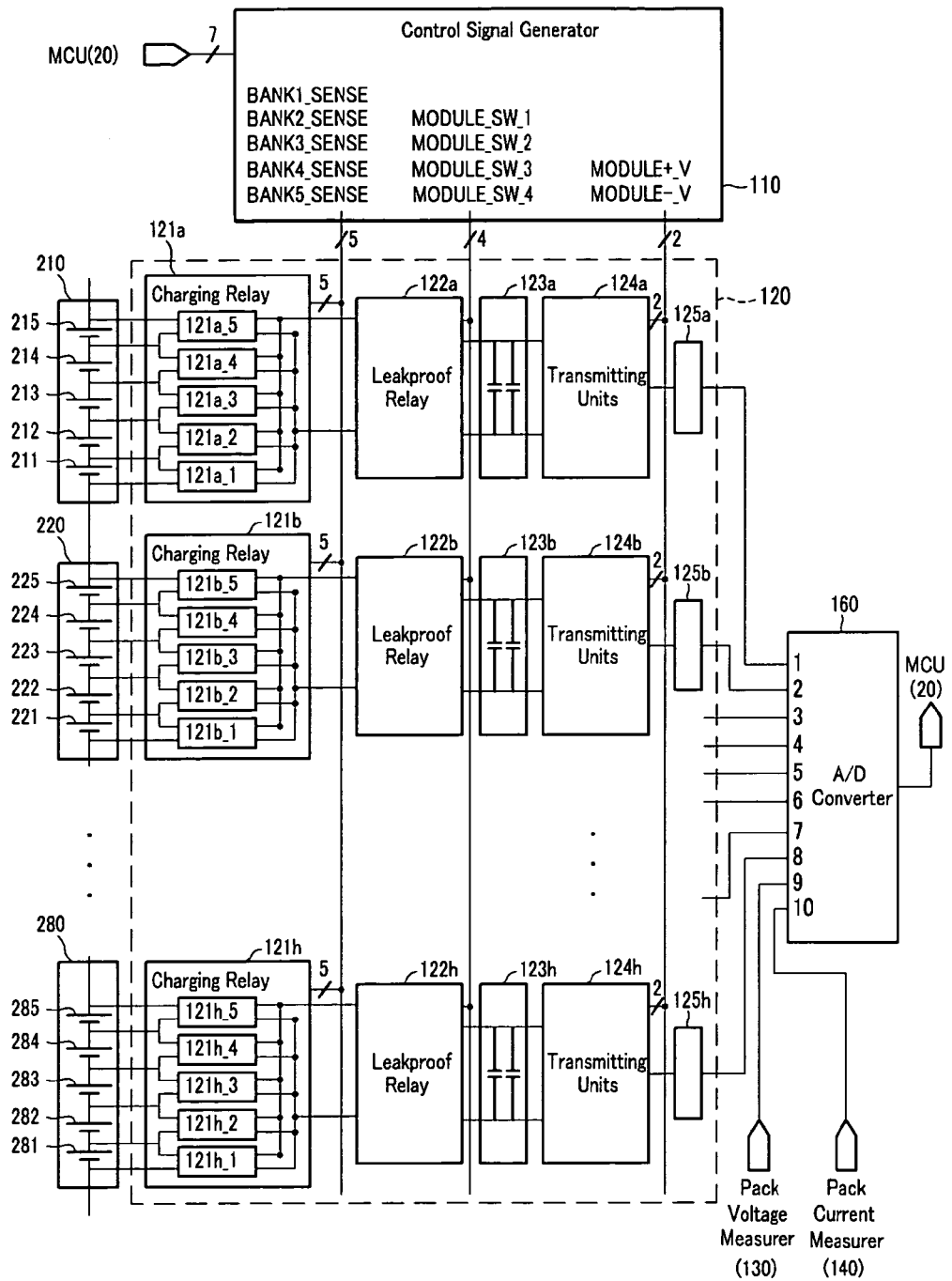
FIG. 3 illustrates in detail a cell voltage measurer according to a first embodiment of the present invention.

FIG. 3 illustrates in detail a cell voltage measurer.

In FIG. 3, the sub-packs 230 to 270 provided between the sub-packs 220 and 280 are not illustrated for simplification and clarification of the drawing. Likewise, charging relays 121c to 121g, leakproof relays 122c to 122g, charging units 123c to 123g, transmitting units 124c to 124g, and buffers 125c to 125g are not illustrated for a brief drawing.

As shown in FIG. 3, the control signal generator 110 receives the five control signals BANK1_SENSE to BANK5_SENSE and the two control signals MODULE+_V and MODULE−_V, that is, a total of 7 control signals from the MCU 20 and outputs the control signals BANK1_SENSE to BANK5_SENSE, the control signals MODULE+_V and MODULE−_V, and the control signals MODULE_SW_1 to MODULE_SW_4 to the cell voltage measurer 120.

The cell voltage measurer 120 includes the charging relays 121a to 121h respectively coupled to the respective sub-packs 210 to 280, the leakproof relays 122a to 122h, the charging units 123a to 123h, the transmitting units 124a to 124h, and the buffers 125a to 125h.

The charging relay 121a includes five cell relays 121a_1 to 121a_5, which are respectively on/off based on the five control signals BANK1_SENSE to BANK5_SENSE output from the control signal generator 110.

Specifically, the cell relay 121a_1 is coupled to a negative terminal 121− and a positive terminal 121+ of the cell 211, and is turned on based on the input control signal BANK1_SENSE and transmits a voltage of the cell 211.

The cell relay 121a_2 is coupled to a negative terminal 122− and a positive terminal 122+ of the cell 212, and is turned on based on the input control signal BANK2_SENSE and transmits a voltage of the cell 212. Likewise, the cell relays 121a_3 to 121a_5 are turned on based on the input control signals BANK3_SENSE to BANK5_SENSE and transmit a voltage of the cells 213 to 215.

The leakproof relay 122a transmits a voltage output from the charging relay 121a to the charging unit 123a based on the control signal MODULE_SW transmitted from the control signal generator 110. In FIG. 3, since the four control signals MODULE_SW_1 to MODULE_SW_4 output from the control signal generator 110 are the same, the leakproof relays 122a to 122h may be operated based on one of the four control signals MODULE_SW_1 to MODULE_SW_4. However, according to the first embodiment, the leakproof relays 122a and 122e are operated based on the control signal MODULE_SW_1, the leakproof relays 122b and 122f are operated based on the control signal MODULE_SW_2, the leakproof relays 122c and 122g are operated based on the control signal MODULE_SW_3, and the leakproof relays 122d and 122h are operated based on the control signal MODULE_SW_4. When one control signal MODULE−SW_1 controls two relays, a current amount of the control signal MODULE_SW_1 may be reduced.

The charging unit 123a includes at least one capacitor and is charged with the cell voltage transmitted from the leakproof relay 122a.

The transmitting unit 124a is turned on based on the two control signals MODULE+_V and MODULE−_V transmitted from the control signal generator 110 and outputs the cell voltage stored in the charging unit 123a to the buffer 125a. That is, the transmitting unit 124a is turned on and transmits a cell voltage to the buffer 125a when both the control signals MODULE+_V and MODULE−_V are given as a high level.

The buffer 125a clamps the cell voltage output from the transmitting unit 124a in the range of a predetermined voltage and outputs the clamped voltage to the first input terminal of the A/D converter 160.

Meanwhile, each structure and operation of the charging relays 121b to 121h, the leakproof relays 122b to 122h, the charging units 123b to 123h, the transmitting units 124b to 124h, and the buffers 125b to 125h is respectively the same as that of the charging relay 121a, the leakproof relay 122a, the charging unit 123a, the transmitting unit 124a, and the buffer 125a. Accordingly, each structure and operation thereof will be not described.

An operation of the cell voltage measurer 120 will be described with reference to the timing diagram of FIG. 4.

Figure 4:
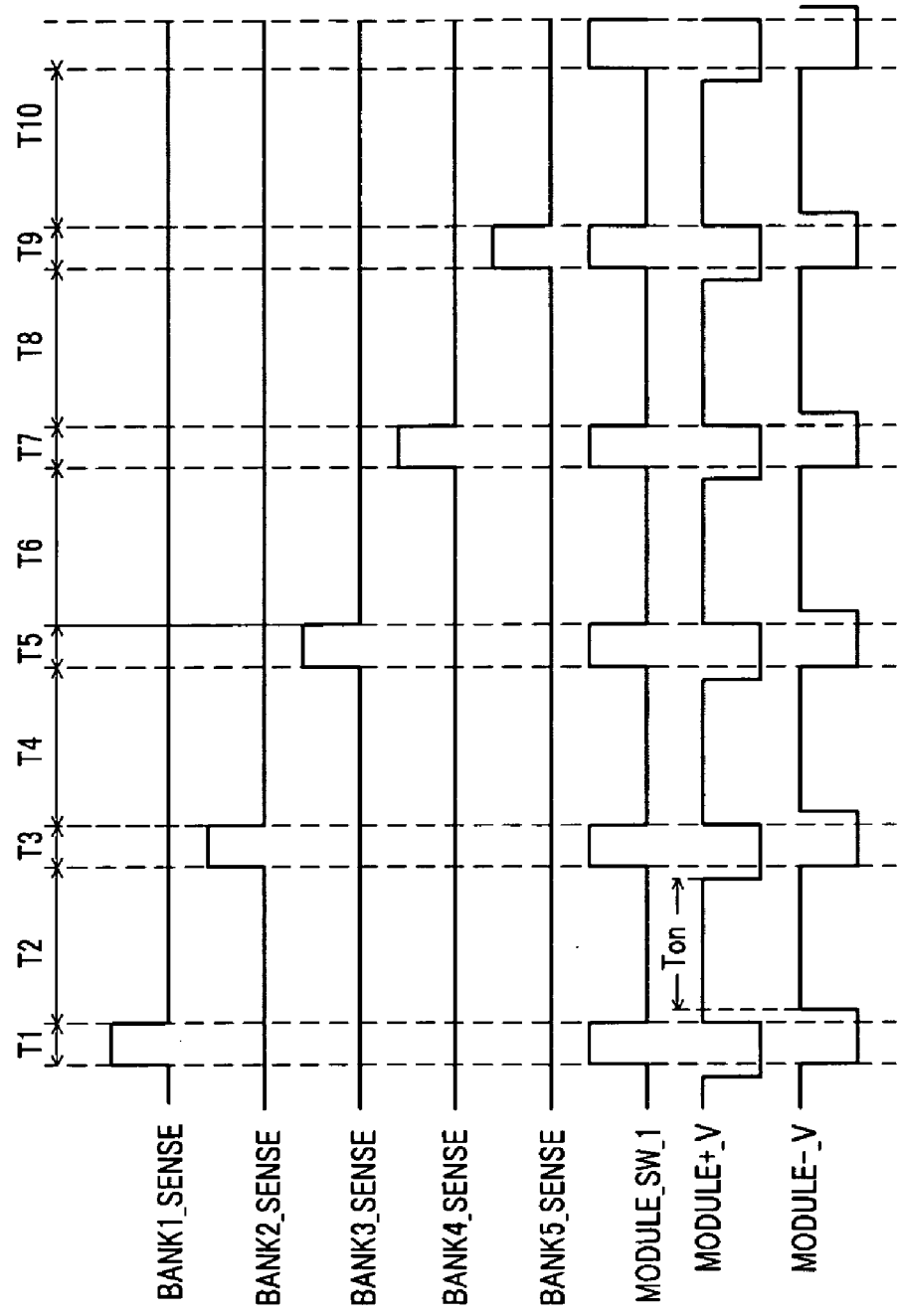
FIG. 4 is a timing diagram of a waveform of a control signal input from a control signal generator to a cell voltage measurer according to the first embodiment of the present invention.

FIG. 4 is a timing diagram of a waveform of a control signal input from a control signal generator to a cell voltage measurer according to a first embodiment of the present invention.

FIG. 4 briefly illustrates the time T2 shorter than the actual length although a time T2 must be illustrated longer than a time T1 because the time T2 corresponds to about 20 times the time T1.

First, during the time T1, the control signals BANK1_SENSE and MODULE_SW_1 are given as the high level and the control signals BANK2_SENSE to BANK5_SENSE, MODULE+_V and MODULE−_V are given as the low level. Accordingly, the cell relay 121a_1 of the charging relay 121a is turned on by the high level of the control signal BANK1_SENSE, and the leakproof relays 122a are turned on by the high level of the control signal MODULE_SW_1. The cell relays 121a_2 to 121a_5 are turned off by the low level of the control signals BANK2_SENSE to BANK5_SENSE. The transmitting unit 124a is turned off since both the control signals MODULE+_V and MODULE−_V are given as the low level. Accordingly, a voltage of the cell 211 is stored in the charging unit 123a through the charging relay 121a and the leakproof relay 122a.

Likewise, the cell relays 121b_1, 121c_1, 121d_1, 121e_1, 121f_1, 121g_1, and 121h_1 and the leakproof relays 122b, 122c, 122d, 122e, 122f, 122g, and 122h are turned on so that the voltages of the cells 221, 231, 241, 251, 261, 271, and 281 are respectively stored in the charging units 123b, 123c, 123d, 123e, 123f, 123g, and 123h.

Next, during the time T2, the control signals BANK1_SENSE to BANK5_SENSE and MODULE_SW_1 are given as the low level. Accordingly, the cell relay 121a_1 and the leakproof relay 122a are turned off. During a time Ton among the time T2, in which both the control signals MODULE+_V and MODULE−_V are given as the high level, the transmitting unit 124a is turned on by the high level of the control signal MODULE so that the voltage of the cell 211 stored in the charging unit 123a is transmitted through the buffer 125a to a first input terminal of the A/D converter 160.

Likewise, during the time Ton, the voltages of the cells 221, 231, 241, 251, 261, 271, and 281 respectively stored in the charging units 123b, 123c, 123d, 123e, 123f, 123g, and 123h are transmitted by the transmitting units 124b, 124c, 124d, 124e, 124f, 124g, and 124h through the buffers 125b, 125c, 125d, 125e, 125f, 125g, and 125h to the second to eighth input terminals of the A/D converter 160. In addition, the ninth and tenth input terminals of the A/D converter 160 receive the outputs of the pack voltage measurer 130 and the pack current measurer 140.

The A/D converter 160 sequentially reads the first input terminal, the second input terminal, the ninth input terminal, the tenth input terminal, the third input terminal, the fourth input terminal, the ninth input terminal, the tenth input terminal, the fifth input terminal, the sixth input terminal, the ninth input terminal, the tenth input terminal, the seventh input terminal, the eighth input terminal, the ninth input terminal, and the tenth input terminal (a total of 16 times) and changes the read data into digital data during the time Ton. As a result, the cell voltages of the first battery cells respectively included in the eight sub-packs 210 to 280 during the times T1 and T2 may be measured.

Meanwhile, in the same manner as in the times T1 and T2, each cell voltage of each of the second battery cells 212 to 282, third battery cells 213 to 283, fourth battery cells 214 to 284, and fifth battery cells 215 to 285 included in the eight sub-packs 210 to 280 may be measured during the times T3 and T4, times T5 and T6, times T7 and T8, and times T9 and T10.

The A/D converter 160 outputs the cell voltages of the 40 cells measured in this manner to the MCU 20 (see FIG. 1). As such, the cell voltages of the battery 2 may be exactly and finely measured.

A control signal generator according to a first embodiment of the present invention will be described with reference to FIG. 5 to FIG. 7.

Figure 5:
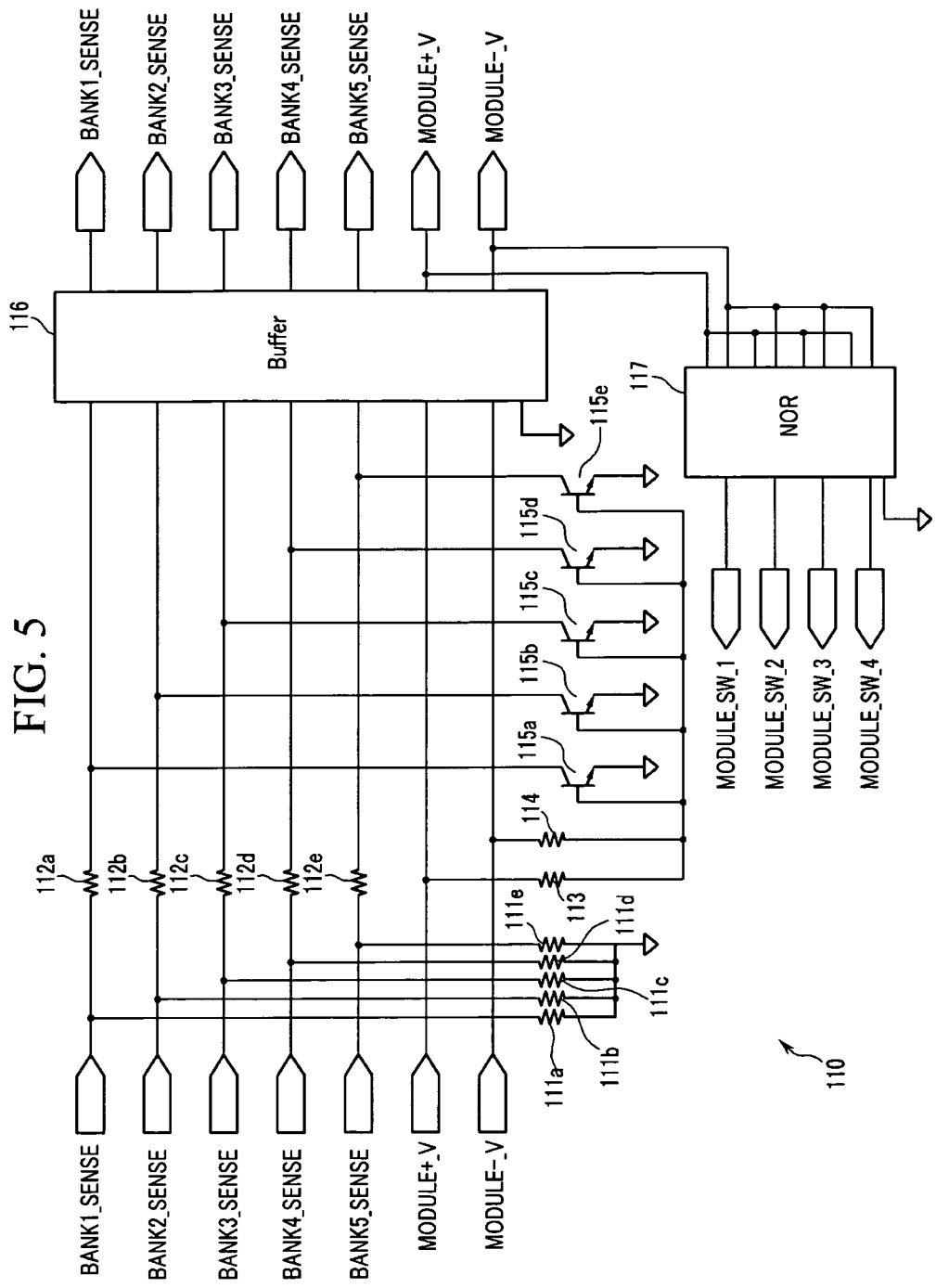
FIG. 5 illustrates in detail a control signal generator according to the first embodiment of the present invention.
Figure 6:
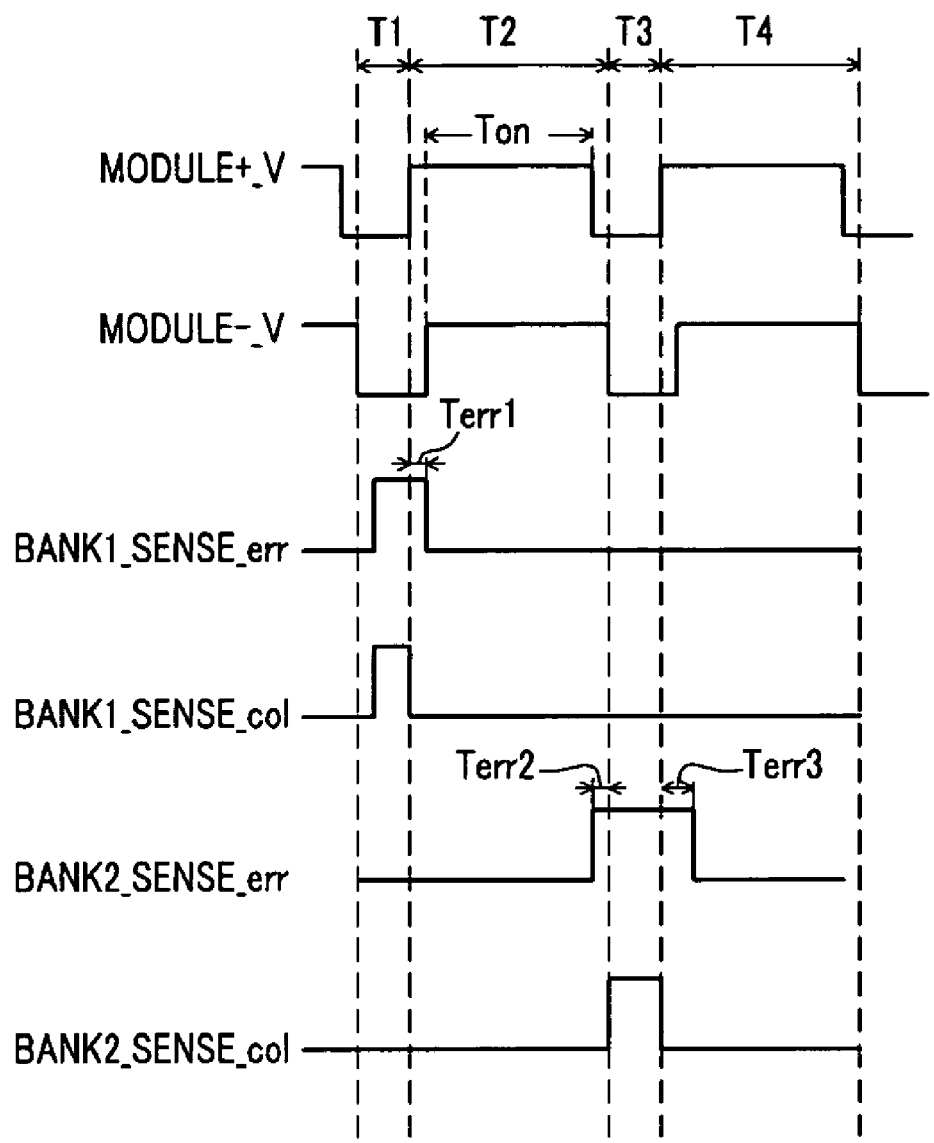
FIG. 6 is a timing diagram of control signals changed by a transistor of FIG. 5.
Figure 7:
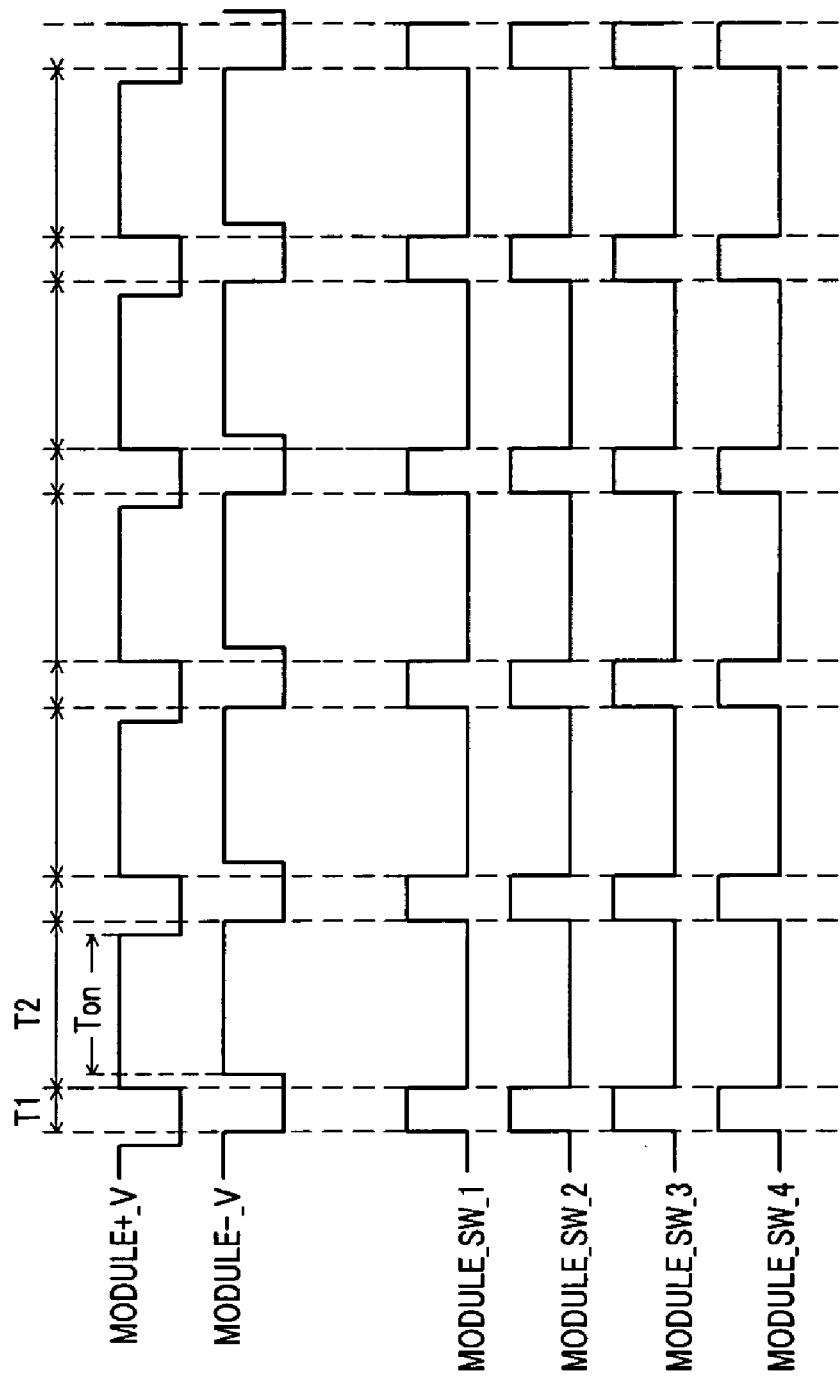
FIG. 7 is a timing diagram showing an operation of a NOR gate of FIG. 5.

FIG. 5 illustrates in detail a control signal generator according to the first embodiment of the present invention, FIG. 6 is a timing diagram of a control signal changed by a transistor of FIG. 5, and FIG. 7 is a timing diagram showing an operation of a NOR gate of FIG. 5.

As shown in FIG. 5, the control signal generator 110 includes five resistors 111a to 111e, five resistors 112a to 112e, two resistors 113 and 114, five transistors 115a to 115e, a buffer 116, and a NOR gate 117.

The five resistors 111a to 111e are for respectively stabilizing voltage amplitude of the five control signals BANK1_SENSE to BANK5_SENSE input from the MCU 20.

The five resistors 112a to 112e are for respectively stabilizing current amplitude of the five control signals BANK1_SENSE to BANK5_SENSE input from the MCU 20.

The two resistors 113 and 114 transmit the voltages of the control signals MODULE+_V and MODULE−_V input from the MCU 20 to a base electrode B of the five transistors 115a to 115e.

The transistor 115a is turned on when the base electrode B thereof is applied with a predetermined current through the resistors 113 and 114 during the times T2, T4, T6, T8, and T10 during which at least one of the control signals MODULE+_V and MODULE−_V is given as the high level. Accordingly, the control signal BANK1_SENSE is forcibly given as the low level because the current flows from a collector C to an emitter E. For example, as shown in FIG. 6, when the error and the delay of the signal transmission are generated at the MCU 20 (see FIG. 1) of the BMS 1, the control signal BANK1_SENSE is changed into the signal BANK1_SENSE_err and the changed signal is transmitted to the control signal generator 110, the high level of the signal BANK1_SENSE_err is forcibly corrected to the low level of the signal BANK1_SENSE_col during a time Terr1 of the time T2. As a result, the time Ton during which the transmitting unit 124a is turned on by the high level of the control signals MODULE+_V and MODULE−_V is not overlapped with the time during which the charging relay 121a_1 is turned on by the high level of the signal BANK1_SENSE_col.

The transistor 115b is turned on when the predetermined voltage is applied to the base electrode B thereof through the resistors 113 and 114 during the times T2, T4, T6, T8, and T10 during which at least one of the control signals MODULE+_V and MODULE−_V is given as the high level. Accordingly, the control signal BANK2_SENSE is forcibly given as the low level because the current is flown from the collector C to the emitter E. For example, as shown in FIG. 6, when the error and the delay of the signal transmission are generated at the MCU 20 (see FIG. 1) of the BMS 1, the control signal BANK2_SENSE is changed into the signal BANK2_SENSE_err and the changed signal is transmitted to the control signal generator 110, the high level of the signal BANK2_SENSE_err is forcibly corrected to the low level of the signal BANK2_SENSE_col during times Terr2 and Terr3 of the times T2 and T4. As a result, the time Ton during which the transmitting unit 124a is turned on by the high level of the control signals MODULE+_V and MODULE−_V is not overlapped with the time during which the charging relay 121a_2 is turned on by the high level of the signal BANK2_SENSE_col.

Likewise, the transistors 115c to 115e are turned on during the times T2, T4, T6, T8, and T10, and accordingly, the respective control signals BANK3_SENSE to BANK5_SENSE are forcibly given as the low level.

The buffer 116 receives the control signals BANK1_SENSE to BANK5_SENSE respectively amended by the transistors 115a to 115e, performs buffering thereof, and outputs the buffered control signals to the charging relays 121a to 121h, and also receives the control signals MODULE+_V and MODULE−_V, performs buffering thereof, and outputs the buffered control signals to the transmitting units 124a to 124h.

The NOR gate 117 receives the control signals MODULE+_V and MODULE−_V, generates the 4 control signals MODULE_SW_1 to MODULE_SW_4, and outputs the same 4 control signals MODULE_SW_1 to MODULE_SW_4 to the leakproof relays 123a to 123h. As shown in FIG. 7, the NOR gate 117 outputs the 4 control signals MODULE_SW_1 to MODULE_SW_4 to be high level when both the control signals MODULE+_V and MODULE−_V are given as the low level.

As such, the control signal generator according to the first embodiment of the present invention prevents all the control signals MODULE+_V, MODULE−_V and BANK1_SENSE to BANK5_SENSE from simultaneously being high level by turning off the five transistors by forcibly changing the control signals BANK1_SENSE to BANK5_SENSE to be off (low level) when at least one of the control signals MODULE+_V and MODULE−_V is given as on (high level). Since the charging relays 121a to 121h and the transmitting units 124a to 124h are not simultaneously turned on, the cell voltages may be more exactly and reliably measured.

In addition, the control signal generator according to the first embodiment of the present invention prevents the leakproof relays 122a to 122h and the transmitting units 124a to 124h from being simultaneously turned on by generating the four control signals MODULE_SW_1 to MODULE_SW_4 to be turned on when both the control signals MODULE+_V and MODULE−_V are off by using the NOR gate. Accordingly, the cell voltages may be reliably measured.

A BMS according to a second embodiment of the present invention will be described in detail with reference to FIG. 8 to FIG. 10.

The BMS according to the second embodiment has the same structure and operation as the cell voltage measurer 120 according to the first embodiment except that the cell voltage measurer is turned on when the charging relay, leakproof relay, and transmitting unit are given as the low level.

Figure 8:
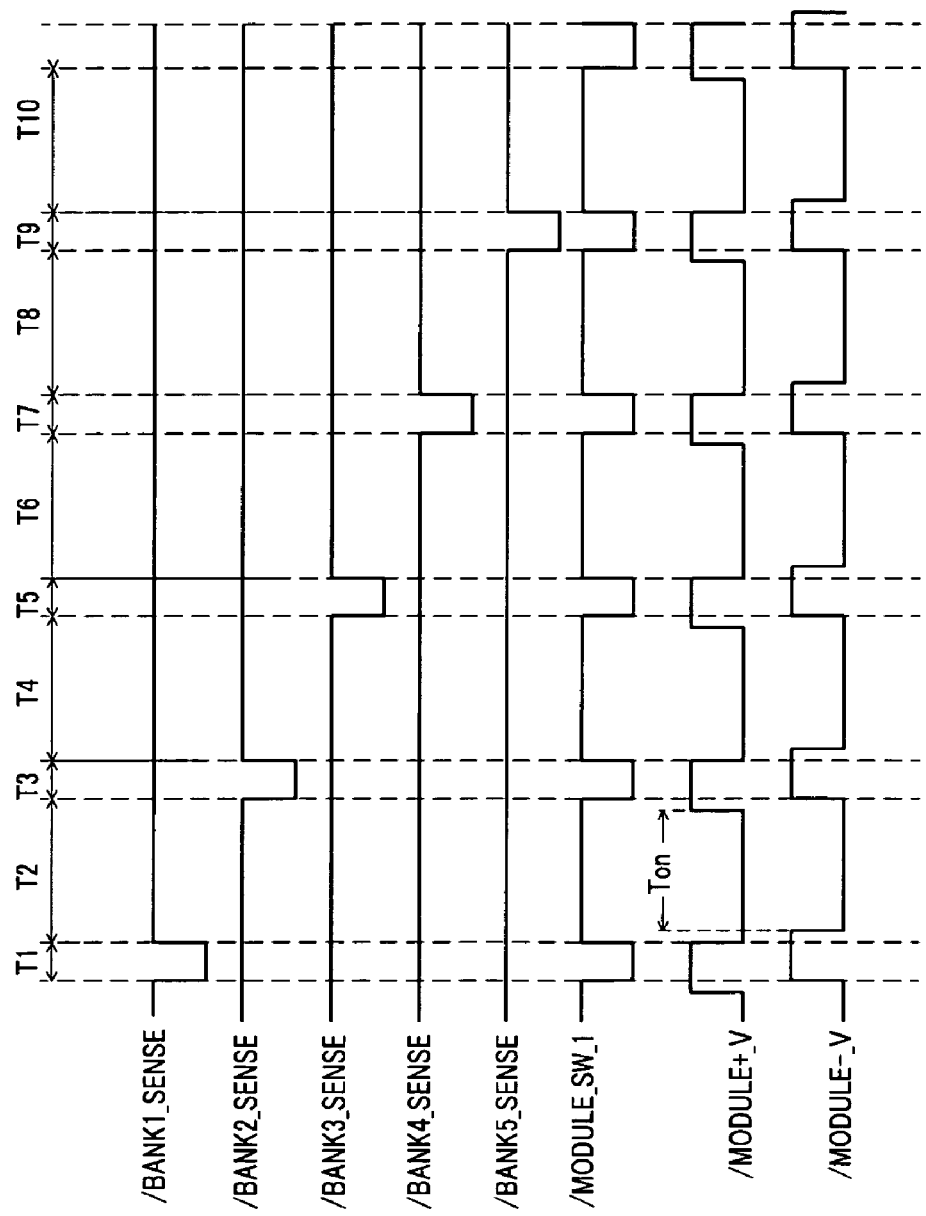
FIG. 8 is a timing diagram of a waveform of control signals input from a control signal generator to a cell voltage measurer according to a second embodiment of the present invention.

FIG. 8 is a timing diagram of a waveform of control signals input from a control signal generator to a cell voltage measurer according to a second embodiment of the present invention.

The control signal generator 110 receives the five control signals BANK1_SENSE to BANK5_SENSE and the two control signals MODULE+_V and MODULE−_V, that is, a total of 7 control signals from the MCU 20, and outputs control signals /BANK1_SENSE to /BANK5_SENSE, /MODULE+_V and /MODULE−_V, and /MODULE_SW_1 to /MODULE_SW_4 to the cell voltage measurer 120.

The control signals /BANK1_SENSE to /BANK5_SENSE, /MODULE+_V and /MODULE−_V, and /MODULE_SW_1 to /MODULE_SW_4 respectively have an inverse phase of the control signals BANK1_SENSE to BANK5_SENSE, MODULE+_V and MODULE−_V, and MODULE_SW_1 to MODULE_SW_4 shown in FIG. 4.

Figure 9:
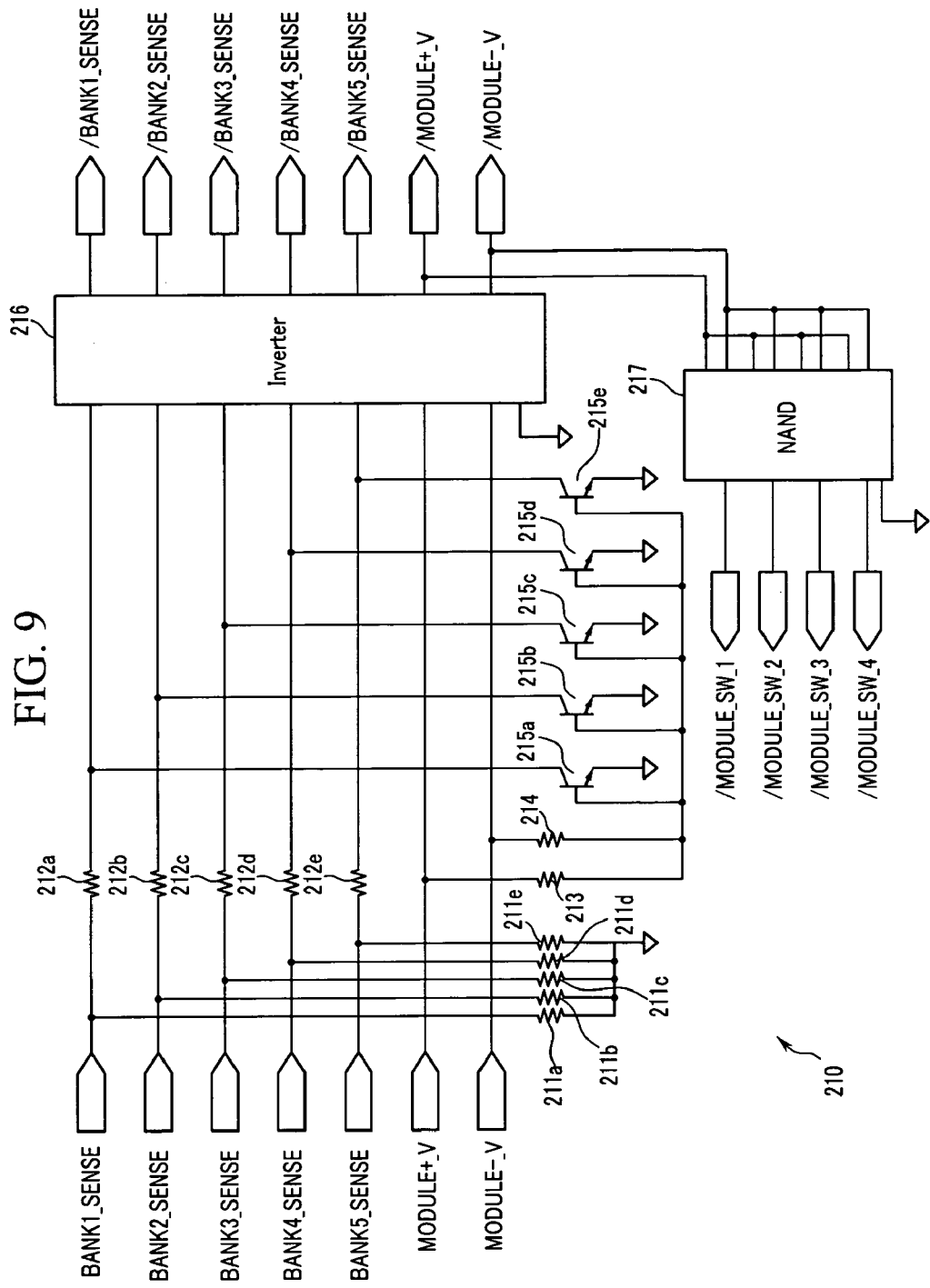
FIG. 9 illustrates in detail a control signal generator according to the second embodiment of the present invention.
Figure 10:
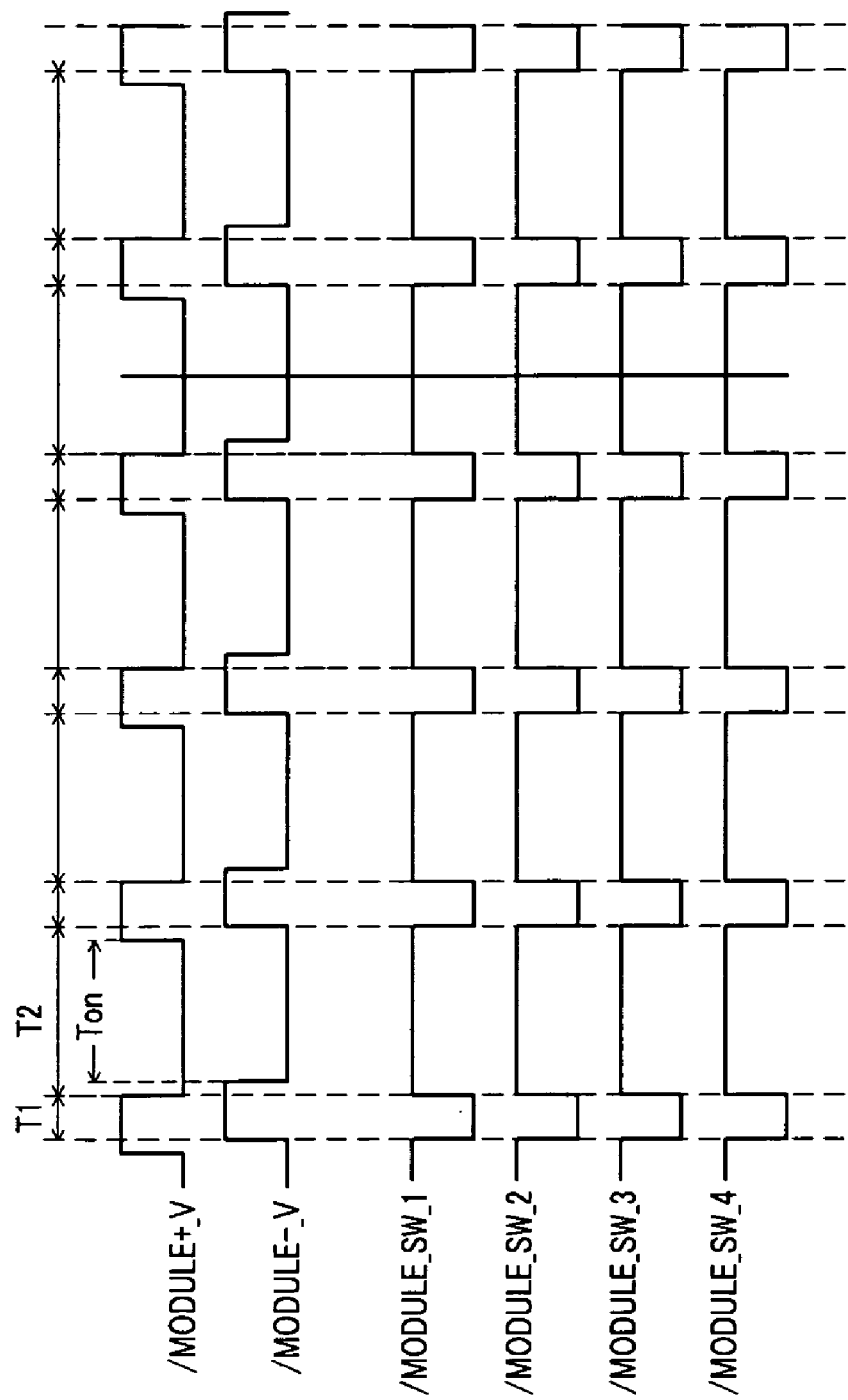
FIG. 10 is a timing diagram showing an operation of a NAND gate of FIG. 9.

FIG. 9 illustrates in detail a control signal generator according to the second embodiment of the present invention and FIG. 10 is a timing diagram showing an operation of a NAND gate of FIG. 9.

The control signal generator 210 according to the second embodiment is different from the control signal generator 110 according to the first embodiment in that the control signal generator 210 includes an inverter 216 and a NAND gate 217.

The five resistors 211a to 211e, the five resistors 212a to 212e, the two resistors 213 and 214, and the five transistors 215a to 215e shown in FIG. 9 have the same structures and functions as the five resistors 111a to 111e, the five resistors 112a to 112e, the two resistors 113 and 114, and the five transistors 115a to 115e shown in FIG. 5, and accordingly, are not described in further detail.

The inverter 216 receives the control signals BANK1_SENSE to BANK5_SENSE respectively corrected by the transistors 215a to 215e and outputs inverted control signals /BANK1_SENSE to /BANK5_SENSE to the charging relays 121a to 121h, and also receives the control signals MODULE+_V and MODULE−_V and outputs inverted control signals /MODULE+_V and /MODULE−_V to the transmitting units 124a to 124h.

The NAND gate 217 receives the control signals /MODULE+_V and /MODULE−_V, generates the 4 control signals /MODULE_SW_1 to /MODULE_SW_4, and outputs the generated control signals /MODULE_SW_1 to /MODULE_SW_4 to the leakproof relays 122a to 122h. As shown in FIG. 10, the NAND gate 217 outputs the 4 control signals /MODULE_SW_1 to /MODULE_SW_4 to be the low level when the control signals /MODULE+_V and /MODULE−_V are given as the high level.

According to the second embodiment of the present invention, the control signals /BANK1_SENSE to /BANK5_SENSE and the control signals /MODULE+_V and /MODULE−_V may not be simultaneously given as the low level, and the control signals /MODULE+_V and /MODULE−_V and the control signals /MODULE_SW_1 to /MODULE_SW_4 may not be simultaneously given as the low level. The charging relays 121a to 121h and the transmitting units 124a to 124h may not be simultaneously turned on and the leakproof relays 122a to 122h and the transmitting units 124a to 124h may not be simultaneously turned on. Accordingly, the cell voltages may be reliably measured.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

According to an embodiment of the present invention, the simultaneous turn-on of the charging relays and the transmitting units transmitting the stored cell voltages of the charging units to the A/D converter may be effectively prevented. Thus, the cell voltages may be more reliably measured, and errors of the BMS generated by the simultaneous turn-on of the charging relays and transmitting units may be effectively prevented.

In addition, according to an embodiment of the present invention, the simultaneous turn-on of the leakproof relays, transmitting the cell voltages to the charging units through the charging relays, and of the transmitting units, transmitting the stored cell voltages of the charging units to the A/D converter may be effectively prevented. Thus, the cell voltages may be more reliably measured, and errors of the BMS generated by the simultaneous turn-on of the leakproof relays and the transmitting units may be effectively prevented.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A control signal generating circuit, comprising:
   a first signal line transmitting a first control signal having an on-level or an off-level;
   a second signal line transmitting a second control signal having the on-level or the off-level;
   a third signal line transmitting a third control signal having the on-level or the off-level;
   a transistor including a first electrode coupled to the first signal line and a second electrode applied with the off-level, and the transistor converting the first control signal into a fourth control signal by being turned on based on the second and third control signals; and
   a circuit unit generating a fifth control signal having the on-level when the second and third control signals are input with the off-level.

2. The control signal generating circuit of claim 1, further comprising:
   a first resistor coupled between the first signal line and the first electrode;
   a second resistor coupled between the first signal line and a ground electrode;
   a third resistor coupled between the second signal line and a control electrode of the transistor; and
   a fourth resistor coupled between the third signal line and the control electrode of the transistor.

3. The control signal generating circuit of claim 2, wherein the transistor is turned on when the second and third control signals have the on-level.

4. The control signal generating circuit of claim 1, further comprising:
   a buffer respectively receiving the fourth control signal, the second control signal, and the third control signal from the first signal line, the second signal line, and the third signal line, wherein the circuit unit receives the second and third control signals output from the buffer.

5. The control signal generating circuit of claim 1, wherein the circuit unit is a NOR gate receiving the second and third control signals and generating the fifth control signal.

6. A control signal generating circuit, comprising:
a first input terminal receiving a first control signal having a first level or a second level as an inverted level of the first level;
a second input terminal receiving a second control signal having the first level or the second level;
a third input terminal receiving a third control signal having the first level or the second level;
a transistor including a first electrode coupled to the first input terminal, a second electrode applied with the second level, and a control electrode being electrically connected to the second and third input terminals;
an inverter outputting fourth, fifth, and sixth control signals by respectively converting the first, second, and third control signals respectively transmitted through the first electrode of the transistor, the second input terminal, and the third input terminal; and
a circuit unit generating a seventh control signal having the second level when the fifth and sixth control signals have the first level.

7. The control signal generating circuit of claim 6, further comprising:
a first resistor coupled between the first input terminal and the first electrode;
a second resistor coupled between the first input terminal and a ground electrode;
a third resistor coupled between the second input terminal and a control electrode of the transistor; and
a fourth resistor coupled between the third input terminal and the control electrode of the transistor.

8. The control signal generating circuit of claim 6, wherein the transistor is turned on so that the first control signal becomes the second level when the second and third control signals have the first level.

9. The control signal generating circuit of claim 6, wherein the circuit unit is a NAND gate receiving the fifth and sixth control signals and generating the seventh control signal.

10. The control signal generating circuit of claim 6, wherein the second level is a ground potential.

11. A control signal generating circuit, comprising:
a first signal line transmitting a first control signal having a low level or a high-level;
a second signal line transmitting a second control signal having the low level or the high level; and,
a transistor including a first electrode coupled to the first signal line, and a second electrode coupled to a ground electrode, the first and second electrodes being electrically connected and the transistor changing the first control signal to be the low level by being turned on when the second control signal is the high level.

12. The control signal generating circuit of claim 11, further comprising:
a first resistor coupled between the first signal line and the first electrode; and
a second resistor coupled between the first signal line and a ground electrode.

13. The control signal generating circuit of claim 12, further comprising: a third resistor coupled between the second signal line and the control electrode.

14. A control signal generating circuit, comprising:
a plurality of first signal lines respectively transmitting a plurality of first control signals;
a plurality of first resistors having first and second terminals, the first terminals being respectively coupled to a plurality of the first signal lines;
second and third signal lines respectively transmitting second and third control signals; and
a plurality of transistors being electrically connected to the second terminals of the first resistors and changing a potential of the second terminals of the plurality of first resistors to be a first level by being turned on based on the second or third control signals.

15. The control signal generating circuit of claim 14, wherein the respective transistors are turned on when the second or third control signal is a second level, excluding the first level.

16. The control signal generating circuit of claim 14, further comprising a circuit unit generating a fourth control signal having a second level when the second and third control signals are input and both the second and third control signals have the first level.

17. The control signal generating circuit of claim 16, wherein the circuit unit outputs a plurality of fourth control signals.

18. A battery management system coupled to a battery formed with one pack having a plurality of battery cells including first and second battery cells, the battery management system comprising:
a control signal generator outputting a first control signal and second, third, and fourth control signals having a first level at different timing from the first control signal, and a fifth control signal that is shifted by a predetermined time from the fourth control signal;
first and second relays respectively transmitting cell voltages of the first and second battery cells by being turned on in response to the first level of the first and second control signals;
a third relay transmitting the cell voltage transmitted through one of the first and second relays in response to the third control signal with the first level;
a charging unit storing the cell voltage transmitted from the third relay;
a fourth relay transmitting the stored cell voltage of the charging unit in response to the first level of the fourth control signal; and
an A/D converter converting the cell voltage transmitted through the fourth relay into digital data,
wherein the control signal generator makes the first and second control signals to be a second level inverted from the first level when the fourth or fifth control signal is the first level, and makes the third control signals to be the first level when the fourth and fifth control signals are the second level.

19. The battery management system of claim 18, wherein the control signal generator comprises:
a common electrode having a potential of the first level;
a first transistor including a first electrode applied with the converted first control signal, a second electrode coupled to the common electrode, and a first control electrode applied with the fourth control signal, electrically connecting the first and second electrodes by being turned on when the converted fourth control signal or the converted fifth control signal is the second level;
a second transistor including a third electrode applied with the converted second control signal and a fourth electrode coupled to the common electrode, and electrically connecting the third and fourth electrodes by being turned on when the converted fourth control signal or the converted fifth control signal is the first level; and an inverter outputting first, second, fourth, and fifth control signals by respectively converting the converted first, second, fourth, and fifth control signals respectively transmitted through the first electrode of the first transistor and the third electrode of the second transistor.

20. The battery management system of claim 19, wherein the first and second transistors respectively include first and second control electrodes, the converted fourth control signal is respectively input through the first resistor to the first and second control electrodes, and the converted fifth control signal is respectively input through the second resistor to the first and second control electrodes.

21. The battery management system of claim 19, wherein the control signal generator further includes a circuit unit receiving the fourth and fifth control signals output from the inverter and outputting the third control signal.

22. The battery management system of claim 21, wherein the circuit unit is a NAND gate outputting the third control signal of the first level when the fourth and fifth control signals output from the inverter are the second level.

23. The battery management system of claim 18, wherein the control signal generator comprises:

a common electrode having a potential of the first level;

a first transistor including a first electrode applied with the first control signal and a second electrode coupled to the common electrode, and electrically connecting the first and second electrodes by being turned on when the fourth control signal or the fifth control signal is the second level;

a second transistor including a third electrode applied with the second control signal and a fourth electrode coupled to the common electrode, and electrically connecting the third and fourth electrodes by being turned on when the fourth control signal or the fifth control signal is the first level; and a buffer outputting first, second, fourth, and fifth control signals by respectively receiving the first, second, fourth, and fifth control signals respectively transmitted through the first electrode of the first transistor and the third electrode of the second transistor.

24. The battery management system of claim 23, wherein the control signal generator further includes a circuit unit receiving the fourth and fifth control signals output from the buffer and outputting the third control signal.

25. The battery management system of claim 24, wherein the circuit unit is a NOR gate outputting the third control signal of the first level when the fourth and fifth control signals output from the buffer are the second level.

26. A battery management system comprising:

a first input terminal receiving a first control signal;
a second input terminal receiving a second control signal;
a transistor including a first electrode coupled to the first input terminal, a second electrode applied with a voltage of a first level, and a control electrode coupled to the second input terminal and turned on when the second control signal is a second level excluding the first level;
a first switch turned on when a third control signal transmitted through the first electrode of the transistor is the second level; and
a second switch turned on when the second control signal is the second level.

27. A battery management system comprising:

a first input terminal receiving a first control signal;
a second input terminal receiving a second control signal;
a third input terminal receiving a third control signal that is shifted by a predetermined time from the second control signal;
a transistor including a first electrode coupled to the first input terminal, a second electrode applied with a voltage of a first level, and a control electrode coupled to the second input terminal and turned on when the second control signal is a second level excluding the first level;
a first switch turned on when a third control signal transmitted through the first electrode of the transistor is the second level;
a second switch turned on when the second control signal is the second level;
a circuit unit generating a fifth control signal having the second level when the second control signal and the third control signal are the first level; and
a third switch turned on when the fifth control signal is the second level.

28. The control signal generating circuit of claim 2, wherein the second resistor stabilizes a voltage amplitude of the first control signal.

29. The control signal generating circuit of claim 2, wherein the first resistor stabilizes a current amplitude of the first control signal.

30. The control signal generating circuit of claim 1, wherein the first, second and third control signals are prevented from simultaneously being at the on-level by turning off the transistor by forcibly changing the first control signal to the off-level when at least one of the second and third control signals is at the on-level.

31. The control signal generating circuit of claim 25, wherein the NOR gate prevents the first, second and fourth relays from being simultaneously turned on by controlling the first control signal to be on while the second and third control signals are turned off.

* * * * *

UNITED STATES PATENT AND TRADEMARK OFFICE
CERTIFICATE OF CORRECTION

PATENT NO.       : 7,593,199 B2                                    Page 1 of 1
APPLICATION NO.  : 11/516693
DATED            : September 22, 2009
INVENTOR(S)      : Yun et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 338 days.

Signed and Sealed this

Twenty-first Day of September, 2010

David J. Kappos
*Director of the United States Patent and Trademark Office*